US008927056B2

(12) United States Patent
Yamaki et al.

(10) Patent No.: US 8,927,056 B2
(45) Date of Patent: Jan. 6, 2015

(54) METHOD OF MANUFACTURING A WIRE GRID POLARIZER

(75) Inventors: Hiroshi Yamaki, Tokyo (JP); Yusuke Sato, Tokyo (JP); Takuji Namatame, Tokyo (JP); Yasuyuki Kawazu, Tokyo (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 1637 days.

(21) Appl. No.: 11/580,842

(22) Filed: Oct. 16, 2006

(65) Prior Publication Data

US 2007/0087549 A1   Apr. 19, 2007

(30) Foreign Application Priority Data

Oct. 17, 2005   (JP) ................................. 2005-301884
Aug. 30, 2006   (JP) ................................. 2006-232968

(51) Int. Cl.
*B05D 5/06*    (2006.01)
*C03C 17/00*   (2006.01)
*G02B 1/10*    (2006.01)
*C23C 16/00*   (2006.01)
*G02B 5/30*    (2006.01)

(52) U.S. Cl.
CPC ..................................... *G02B 5/3058* (2013.01)
USPC ........ 427/163.1; 427/164; 427/165; 427/166; 427/162; 427/248.1; 427/250; 427/255.11

(58) Field of Classification Search
CPC ................................................... G02B 5/3058
USPC ............................. 427/162–169, 248.1–255.7
See application file for complete search history.

(56) References Cited

U.S. PATENT DOCUMENTS

| | | | | |
|---|---|---|---|---|
| 6,122,103 | A * | 9/2000 | Perkins et al. | 359/486 |
| 6,251,297 | B1 * | 6/2001 | Komuro et al. | 216/24 |
| 2001/0053023 | A1 * | 12/2001 | Kameno et al. | 359/486 |
| 2004/0239833 | A1 * | 12/2004 | Kawazu et al. | 349/96 |
| 2005/0088739 | A1 * | 4/2005 | Chiu et al. | 359/486 |
| 2005/0122588 | A1 * | 6/2005 | Kunisada et al. | 359/585 |

FOREIGN PATENT DOCUMENTS

| | | | |
|---|---|---|---|
| JP | 09-090122 | * | 4/1997 |
| JP | 2000-158450 | | 6/2000 |
| JP | 2003-502708 | | 1/2003 |
| JP | 2005-181990 | | 7/2005 |
| WO | WO 00/79317 A1 | | 12/2000 |

* cited by examiner

*Primary Examiner* — David Turocy
*Assistant Examiner* — Michael G Miller
(74) *Attorney, Agent, or Firm* — Finnegan, Henderson, Farabow, Garrett & Dunner, L.L.P.

(57) ABSTRACT

A dielectric layer 2 is formed on a region including grid-shaped convex portions 1a of a resin substrate 1 having the grid-shaped convex portions 1a with pitches of 80 nm to 120 nm on its surface, and metal wires 3 are formed on the dielectric layer 2. It is thereby possible to obtain a wire grid polarizer having a microstructural concavo-convex grid with pitches of the level of 120 nm or less that has not been implemented.

11 Claims, 6 Drawing Sheets

FREE-END UNIAXIAL
DRAWING DIRECTION (b)

METHOD OF MANUFACTURING A WIRE GRID POLARIZER

BACKGROUND OF THE INVENTION

1. Field of the Invention

The present invention relates to a method of manufacturing a wire grid polarizer having a microstructural concavo-convex grid.

2. Related Background Art

The recent development of photolithography technique has enabled formation of a microstructural pattern with pitches of the level of the wavelength of light. Members and products with such extremely small pitches are of wide application and useful not only in the semiconductor field but also in the optical field.

For example, in a wire grid where conductor lines such as metal and the like are arranged in the shape of a grid with specific pitches on a substrate, when the pitches are remarkably smaller than (for example, less than half) the incident light (for example, visible light with wavelengths of 400 nm to 800 nm), the wire grid reflects almost all the electric field vector component vibrating in parallel with the conductor lines, while allowing almost all the electric field vector component perpendicular to the conductor lines to pass through the grid, and is capable of being used as a wire grid polarizer to generate a polarized light beam. Such a wire grid polarizer reflects the light which is not passed through to be reused, and is desirable from the viewpoint of effective use of the light. However, in the existing photolithography technique, it has been difficult to manufacture a wire grid with pitches of 120 nm or less.

SUMMARY OF THE INVENTION

It is an object of the present invention to provide a method of manufacturing a wire grid polarizer enabling acquisition of the wire grid polarizer having a microstructural concavo-convex grid with pitches of the level of 120 nm or less that has not been implemented.

A method of manufacturing a wire grid polarizer of the invention has the steps of forming a dielectric layer on a region including grid-shaped convex portions of a resin substrate having the grid-shaped convex portions on its surface, and forming metal wires on the dielectric layer.

In the method of manufacturing a wire grid polarizer of the invention, in the step of forming the dielectric layer, it is preferable that the dielectric layer is formed to cover the grid-shaped convex portions of the resin substrate and at least part of side faces of the portions.

In the method of manufacturing a wire grid polarizer of the invention, a grid shaped convex portion is applied to a resin substrate by transferring a microstructual concavo-convex grid to the resin substrate, using a mold that is made by performing uniaxial drawing on a drawing target member with a concavo-convex grid with pitches of 100 nm to 100 μm on its surface, in the direction substantially parallel to a longitudinal direction of the concavo-convex grid, with a width of the drawing target member made free in the direction substantially perpendicular to the longitudinal direction.

In the method of manufacturing a wire grid polarizer of the invention, it is preferable to use the resin substrate having the grid-shaped convex portions with pitches of 80 nm to 120 nm on the surface of the resin substrate.

In the method of manufacturing a wire grid polarizer of the invention, it is preferable that the resin substrate is prepared by performing uniaxial drawing on a drawing target member with a concavo-convex grid with pitches of 100 nm to 100 μm on its surface, in the direction substantially parallel to a longitudinal direction of the concavo-convex grid, with a width of the drawing target member made free in the direction substantially perpendicular to the longitudinal direction.

In the method of manufacturing a wire grid polarizer of the invention, it is preferable that the resin substrate is shaped using a mold having grid-shaped convex portions with pitches of 80 nm to 120 nm on its surface.

In the method of manufacturing a wire grid polarizer of the invention, it is preferable that the grid-shaped convex portions have a height 0.5 time to 2.0 times the pitches of the grid-shaped convex portions.

In the method of manufacturing a wire grid polarizer of the invention, it is preferable that the dielectric layer has a thickness ranging from 2 nm to 200 nm.

In the method of manufacturing a wire grid polarizer of the invention, it is preferable that the metal wires have a thickness ranging from 120 nm to 220 nm.

In the method of manufacturing a wire grid polarizer of the invention, in the step of forming the metal wires, it is preferable that the metal wires are formed by depositing metal in the direction of an about 30° or less angle formed between the normal of the plane of the resin substrate and a source of vapor deposition within a plane perpendicularly intersecting the longitudinal direction of a grid of the grid-shaped convex portions.

BRIEF DESCRIPTION OF THE DRAWINGS

The various features of novelty which characterize the invention are pointed out with particularity in the claims attached to and forming a part of this specification. For a better understanding of the invention, its operating advantages, and specific objects attained by its use, reference should be had to the accompanying drawing and descriptive matter in which there is illustrated and described a preferred embodiment of the invention.

DESCRIPTION OF THE PREFERRED EMBODIMENTS

It is a feature of a method of manufacturing a wire grid polarizer according to the present invention having the steps of forming a dielectric layer on a region including grid-shaped convex portions of a resin substrate having the grid-shaped convex portions on its surface, and forming metal wires on the dielectric layer.

Explanation on the resin substrate, dielectric and metal wires

Figure 1:
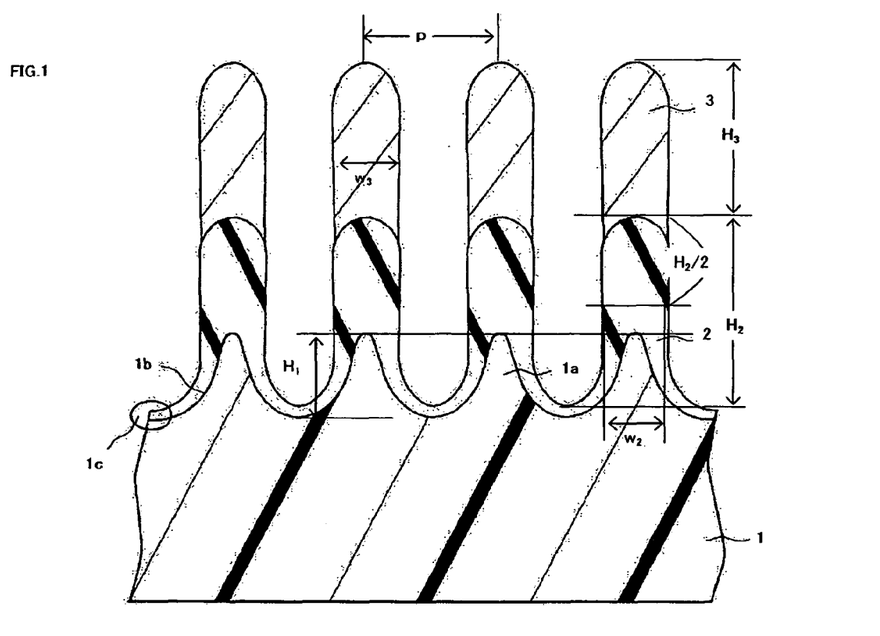
FIG. 1 is a schematic cross-sectional view showing part of a wire grid polarizer according to an embodiment of the invention.

FIG. 1 is a schematic cross-sectional view showing part of a wire grid polarizer obtained by the manufacturing method according to the invention. A resin for use in a resin substrate 1 is required to be a resin substantially transparent in the visible region. Examples of such a resin include amorphous thermoplastic resins such as a poly methyl methacrylate resin, poly carbonate resin, polystyrene resin, cycloolefin resin (COP), cross-linked polyethylene resin, polyvinyl chloride resin, polyallylate resin, polyphenylene ether resin, modified polyphenylene ether, polyether imide resin, polyether sulfone resin, polysulfone resin, polyether ketone resin and the like, crystalline thermoplastic resins such as polyethylene terephthalate (PET) resin, polyethylene naphthalate resin, polyethylene resin, polypropylene resin, polybutylene terephthalate resin, aromatic polyester resin, polyacetal resin, polyamide resin and the like, and acryl based, epoxy based, or urethane based ultraviolet curable resins or thermosetting resins and the like. Further, as a substrate, a configuration may be used which is obtained by combining a UV curable resin and/or thermosetting resin that is the resin substrate 1, an inorganic substrate such as glass and the like, the above-mentioned thermoplastic resin, and triacetate resin.

Pitches of grid-shaped convex portions 1a on the resin substrate 1 are 120 nm or less, and preferably range from 80 nm to 120 nm, with consideration given to polarization characteristics over a wide range in the visible region. The polarization characteristics improve as the pitch decreases, and in the visible region, sufficient polarization characteristics are obtained using the pitch ranging from 80 nm to 120 nm. Further, when importance is not placed on polarization characteristics of the light with short wavelengths around 400 nm, the pitch can be increased to near 150 nm.

When a thermoplastic resin is used for the resin substrate, it is possible to control the pitches of the grid-shaped convex portions by adjusting conditions of drawing processing performed on the resin substrate provided with a shape of the grid-shaped convex portions. In addition, the pitch p of the grid-shaped convex portions of the resin substrate, the pitch of the dielectric layer, and the pitch of the metal wires are almost the same as the pitch of the wire grid of the invention, and regarded as taking the same pitch p.

A height $H_1$ of the grid-shaped convex portions 1a of the resin substrate is 0.5 time to 2.0 times the pitch p of the grid-shaped convex portions 1a, and preferably is 1.0 time to 2.0 times the pitch P, in consideration of obtaining excellent optical characteristics, increasing the adhesion between the substrate and dielectric layer, and depositing the dielectric layer selectively and highly on the grid-shaped convex portions 1a.

Cross-sectional shapes are not limited particularly in the grid-shaped convex portions 1a, and concave portions 1c of a microstructural concavo-convex grid formed by a plurality of grid-shaped convex portions of the resin substrate 1. For example, cross sections of the portions may be trapezoidal, rectangular, square, and sinusoidal shape such as a prism-shape, semi-circular shape and the like. Herein, the sinusoidal shape means having curvature portions formed by repetition of the concave portion and convex portion. In addition, the curvature portions only need to have a curved line, and for example, a shape of the concave portion with a constriction is included in the sinusoidal shape. From the viewpoint of easiness of the dielectric to cover the grid-shaped convex portions of the resin substrate and at least part of side faces of the portions, an edge or top and a valley of the shape are preferably curved with a moderate curvature. Further, from the viewpoint of improving the adhesion strength between the resin substrate and dielectric layer, the cross section is preferably formed in the sinusoidal shape.

The dielectric constituting a dielectric layer 2 is required to a dielectric transparent substantially in the visible region. Dielectric materials may be suitably used which have high adhesion with the material constituting the resin substrate 1 and the metal constituting metal wires 3. For example, used are oxides, nitrides, halogen compounds and carbides of silicon (Si) which can be used alone or as a compound thereof, and oxides, nitrides, halogen compounds, and carbides of metal, which can be used alone or as a compound (dielectric combined with another element, another dielectric, or compound), such as aluminium (Al), chromium (Cr), yttrium (Y), zirconium (Zr), tantalum (Ta), titanium (Ti), barium (Ba), indium (In), tin (Sn), zinc (Zn), magnesium (Mg), calcium (Ca), cerium (Ce), copper (Cu) and the like.

In the invention, in order to obtain sufficient adhesion strength between the resin substrate 1 and metal wires 3, it is preferable that the dielectric layer 2 is provided to cover the grid-shaped convex portions 1a of the resin substrate and at least part of side faces 1b of the portions 1a. From the viewpoints of improvement in adhesion between the grid-shaped convex portions and dielectric layer and suppression of low-molecule volatiles generated from the resin substrate, it is more preferable that the entire microstructural concavo-convex grid is covered with the dielectric layer 2. In addition, in the invention, it is referred to as selective deposition that in the microstructural concavo-convex grid shape, the dielectric and metal is coated thicker or deposited higher mainly on the convex portions than the side faces of the convex portions and concavo portions 1c.

The thickness of the dielectric layer 2 (hereinafter, referred to as a height of the dielectric layer) coated on the grid-shaped convex portions 1a of the resin substrate preferably ranges from 2 nm to 200 nm, from the viewpoints of optical characteristics, adhesion strength between the resin substrate and metal wires, structural strength of the wire grid, time required for coating, selective deposition of the metal wires, and the like. Particularly, the height of the dielectric layer on the grid-shaped convex portion 1a of the resin substrate is preferably in the range of 5 nm to 150 nm. Further, with respect to a height difference $H_2$ (hereinafter, referred to as a height difference $H_2$) between the peak of the convex portion and the valley of the concave portion of the concavo-convex grid formed by coating the grid-shaped convex portions 1a of the resin substrate with the dielectric layer 2, the height difference $H_2$ is preferably in the range of 100 nm to 300 nm, and more preferably in the range of 150 nm to 250 nm, in consideration of the structural strength as a base of the metal wires, and optical characteristics.

It is assumed that a width of the convex portion of the concavo-convex grid, formed by coating the grid-shaped convex portions 1a of the resin substrate with the dielectric, at the half height of the height difference $H_2$ is a width $w_2$ of the dielectric layer (hereinafter referred to as a width of the dielectric layer). From the viewpoints of optical characteristics and structural strength of the wire grid, it is preferable that the width $w_2$ of the dielectric layer is 0.3 time to 0.6 time the pitch of the grid-shaped convex portions of the resin substrate. When an oblique deposition method, described later, is used in depositing the metal, the width $w_2$ of the dielectric layer is preferably 0.1 time to 0.5 time the pitch of the grid-shaped convex portions of the resin substrate.

As a method of forming the dielectric layer on the region including the grid-shaped convex portions of the resin substrate having the grid-shaped convex portions, the method is selected as appropriate corresponding to the material constituting the dielectric layer. For example, physical deposition methods may be used suitably such as a sputtering method, vacuum deposition method and the like. The sputtering method is preferable from the viewpoint of the adhesion strength.

The metal constituting the metal wires 3 used in the invention is preferably high in reflectance in the visible region and further high in adhesion with the material constituting the dielectric layer. For example, the metal wires 3 are preferably formed of aluminium (Al), silver or an alloy thereof. In terms of cost, the metal wires 3 are more preferably formed of aluminium or alloy of aluminium.

A width $w_3$ of the metal wire preferably ranges from 0.3 time to 0.6 time the pitch of the grid-shaped convex portions of the resin substrate, from the viewpoints of optical characteristics such as the degree of polarization, transmittance and the like, and structural strength of the wire grid.

A thickness $H_3$ of the metal wire 3 (hereinafter, referred to as a height of the metal wire) formed on convex portions of the concavo-convex grid formed of the dielectric layer 2 coated on the grid-shaped convex portions 1a of the resin substrate preferably ranges from 120 nm to 220 nm, and more preferably, ranges from 140 nm to 200 nm, from the viewpoints of optical characteristics, adhesion strength between the metal wires and convex portions of the dielectric layer, structural strength of the wire grid polarizer, and a processing time required for deposition. Further, a ratio $H_3/w_3$ (aspect ratio) of the height $H_3$ of the metal wire to the width $w_3$ of the metal layer preferably ranges from 2 to 5, and more preferably, ranges from 2 to 4.

A method of depositing the metal on the dielectric layer to form the metal wires is not limited particularly, as long as the method provides sufficient adhesion between the material constituting the dielectric layer and the metal constituting the metal wires. For example, physical methods may be used suitably such as the vacuum deposition method, sputtering method, ion plating method and the like. Preferable among the methods is a method enabling the metal to be deposited selectively on convex portions of the dielectric layer or to be depositied selectively leaning to one side faces of the convex portions of the dielectric layer. Such a method includes the vacuum deposition method, for example.

In addition, from the viewpoint of optical characteristics, an amount as small as possible is preferable for the metal deposited on the bottom and its vicinity of the concave portion of the microstructural concavo-convex grid. Accordingly, to avoid deposition of the metal at these portions, and further, to facilitate etching (polishing by the etching) described later when the metal is deposited, it is preferable that an oblique deposition method is used to deposit the metal. The oblique deposition method referred to as in the invention is a method for depositing the metal in the direction of an angle (incident angle) θ of 30° or less, preferably 10° to 20°, where the angle θ is formed between the normal of the plane of the resin substrate and a source of vapor deposition within a plane intersecting perpendicularly the grid longitudinal direction of the microstructural concavo-convex grid.

A method of obtaining the resin substrate having the grid-shaped convex portions of the invention A method of obtaining the resin substrate having the grid-shaped convex portions of the invention is not limited particularly, but it is preferable to use a method (that is divided into method I and method II in the invention to be explained) as described in Japanese Patent Application No. 2006-2100 by the Applicant.

More specifically, as method I of obtaining the resin substrate having the grid-shaped convex portions with pitches of 120 nm or less of the invention, it is preferable to prepare the resin substrate by performing free-end uniaxial drawing processing on a drawing target member with a concavo-convex grid with pitches of 100 nm to 100 μm on its surface, in the direction substantially parallel to a longitudinal direction of the concavo-convex grid, with a width of the drawing target member made free in the direction substantially perpendicular to the longitudinal direction (parallel with the grid of the grid-shaped convex portions) of the concavo-convex grid. As a result, the pitches of the convex portions of the concavo-convex grid of the drawing target member are reduced, and the resin substrate (drawn member) is obtained which has the microstructural concavo-convex grid with pitches of 120 nm or less. The pitch of the concavo-convex grid is set at a range of 100 nm to 100 μm, and capable of being modified as appropriate corresponding to a required pitch of a microstructural concavo-convex grid and draw ratio.

Herein, as the drawing target member, transparent resin substrates may be used which are in the form of a plate, film, sheet or the like and comprised of the amorphous thermoplastic resin or crystalline thermoplastic resin as described previously as the resin substrate for use in the invention. The thickness, size and the like of the drawing target member are not limited particularly, as long as the member allows the uniaxial drawing processing.

Further, to obtain the drawing target member having on its surface the concavo-convex grid with pitches of 100 nm to 100 μm, using a mold having the concavo-convex grid with pitches of 100 nm to 100 μm formed by an interference exposure method using laser light, cut method and the like, the concavo-convex grid shape may be transferred to the drawing target member by a method of hot press or the like. In addition, the interference exposure method is an exposure method using interference fringes formed by emitting laser beams with a specific wavelength from two directions of the angle θ', and by varying the angle Θ', it is possible to obtain structures of concavo-convex grids with various pitches in a range wavelengths of the used laser. The laser for use in interference exposure method is limited to lasers of $TEM_{00}$ mode. As a UV laser allowed to perform laser oscillation of $TEM_{00}$ mode, there may be an argon layer (wavelength: 364 nm, 351 nm, 333 nm), four-time wave of YAG laser (wavelength: 266 nm), and the like.

In the uniaxial drawing processing in the invention, first, with the drawing target member made free in the width direction (perpendicular to the longitudinal direction of the concavo-convex grid), the longitudinal direction of the concavo-convex grid of the drawing target member is fixed to a uniaxial drawing processing apparatus. Next, the drawing target member is heated to an appropriate temperature at which the member softens, maintained in this state for a suitable time, and then, subjected to the drawing processing to a draw ratio corresponding to the pitch of the target microstructural concavo-convex grid at a proper drawing rate in one direction substantially parallel with the longitudinal direction. Finally, with the drawn state kept, the drawing target member is cooled to a temperature at which the member hardens, and the resin substrate is obtained which has the grid-shaped convex portions with pitches of 120 nm or less. The uniaxial drawing processing is such a method that has aforementioned processes. As an apparatus to perform the uniaxial drawing processing, it is possible to use apparatuses that perform general uniaxial drawing processing. Further, for the heating condition and cooling condition, the conditions are determined as appropriate corresponding to the material constituting the drawing target member.

Further, method II of obtaining the resin substrate having the grid-shaped convex portions with pitches of 120 nm or less of the invention is a method of using a mold having on its surface a microstructural concavo-convex grid with pitches of 120 nm or less, transferring the microstructural concavo-convex grid to the surface of the resin substrate for use in the invention, and forming the resin substrate. Herein, the mold having on its surface the microstructural concavo-convex grid with pitches of 120 nm or less can be produced by performing conductor processing, plating processing and removal processing of the resin substrate successively on the resin substrate having the grid-shaped convex portions with pitches of 120 nm or less obtained by method I.

According to this method, since the mold is used which already has the grid-shaped convex portions with pitches of 120 nm or less, it is possible to produce in quantity the resin substrate having the grid-shaped convex portions with pitches of 120 nm or less for use in the invention, without taking complicated drawing process. Further, by combining method I and method II suitably to use repeatedly, it is made possible to prepare a finer concavo-convex grid from a concavo-convex grid with relatively large pitches.

A method of manufacturing a wire grid polarizer of the invention

Figure 2:
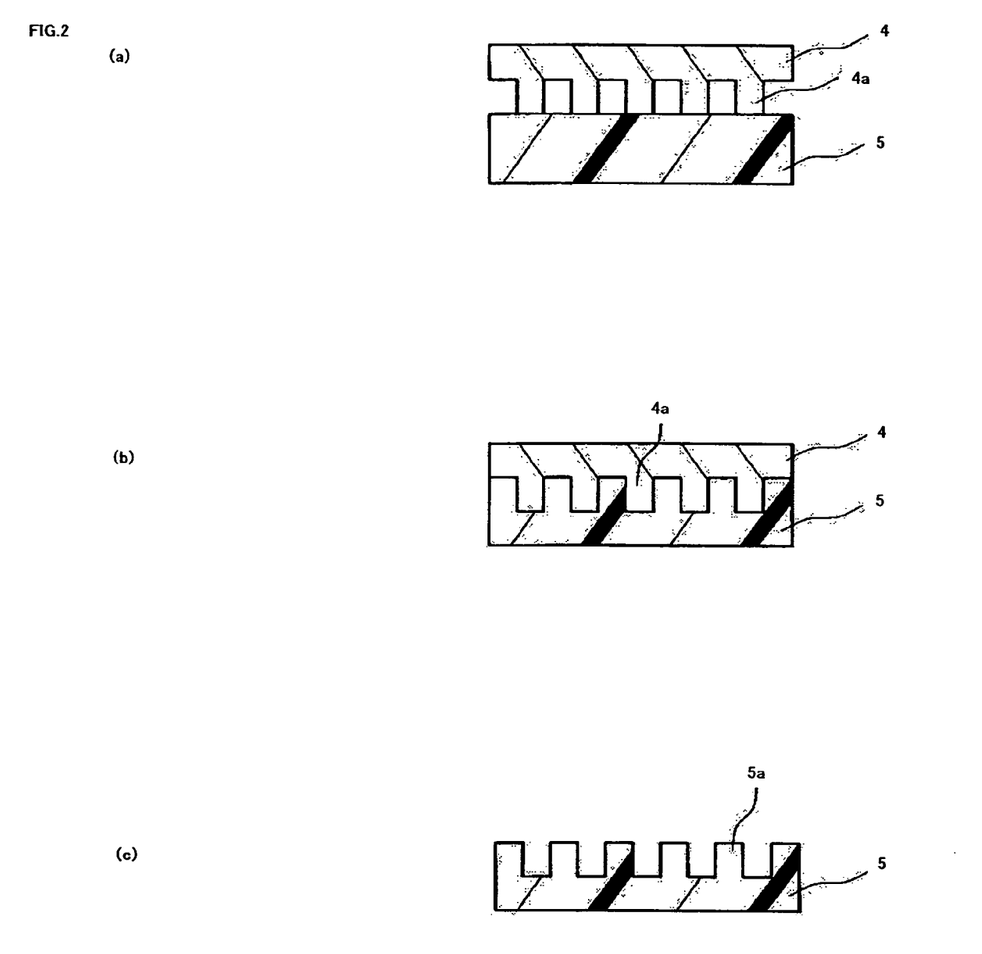
FIGS. 2(a) to 2(c) are cross-sectional views to explain a method of obtaining a drawing target member with a concavo-convex grid to explain a method of manufacturing the wire grid polarizer according to the embodiment of the invention.
Figure 3:
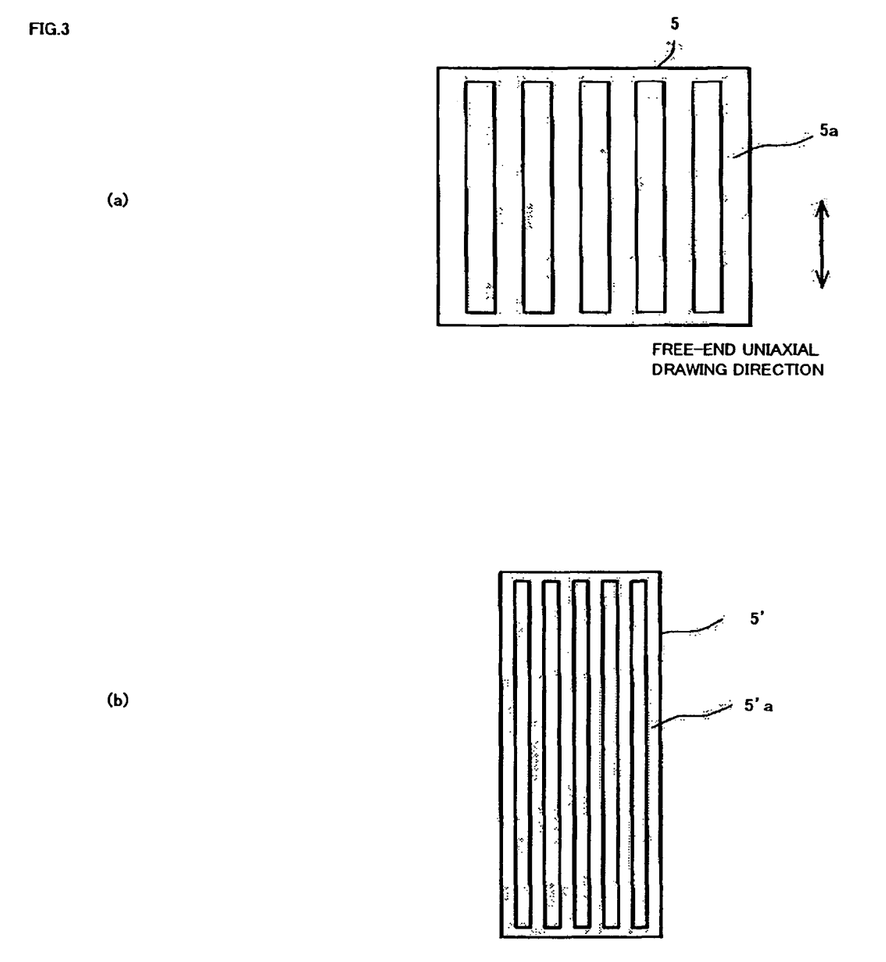
FIGS. 3(a) and 3(b) are top views of the drawing target member prior and subsequent to free-end uniaxial drawing to explain the method of manufacturing the wire grid polarizer according to the embodiment of the invention.

Described herein is a method of manufacturing a wire grid polarizer of the invention by the above-mentioned methods I and II, with reference to drawings. FIG. 2(a) to 2(c) are cross-sectional views to explain the method of obtaining the drawing target member with the concavo-convex grid according to the invention, and FIGS. 3(a) and 3(b) are top views of the drawing target member prior and subsequent to drawing obtained by the free-end uniaxial drawing of the drawing target member having the concavo-convex grid according to the invention. FIGS. 4(a) to 4(g) are cross-sectional views to explain the method of manufacturing a wire grid polarizer according to this embodiment of the invention. FIG. 1 is a schematic cross-sectional view showing part of the wire grid polarizer obtained by the manufacturing method of the invention, and an enlarged view of FIG. 4(g).

Process of Obtaining the Resin Substrate having the Grid-Shaped Convex Portions for use in the Invention First, a mold (stamper) 4 as shown in FIG. 2(a) is prepared which has a concavo-convex grid 4a with pitches of 100 nm to 100 μm on its surface. The stamper 4 is obtained as described below. A resist material is coated on a glass substrate by spin coating to form a resist layer, and the resist layer is exposed using the interference exposure method to develop the resist layer. The resist layer is thereby obtained which has the concavo-convex grid with pitches of 100 nm to 100 μm. Next, nickel, gold or the like is sputtered on the resist layer to make the resist layer conductive. Further, electroplating of nickel is performed on the sputtered metal to form a nickel plate. Finally, the nickel plate is peeled off from the glass substrate, and the resist layer is removed from the nickel layer. It is thereby possible to prepare the stamper 4 with the concavo-convex grid 4a with pitches of 100 nm to 100 μm on its surface. In addition, the method of preparing the stamper 4 is not limited to the above-mentioned method, and another method may be used.

Then, as shown in FIGS. 2(a) and 2(b), the drawing target member 5 is pressed against the concavo-convex grid 4a side of the stamper 4 by processing such as hot press to transfer the pattern of the concavo-convex grid 4a to the drawing target member 5. In addition, the drawing target member 5 can be prepared by injection molding, extrusion molding and the like, when the material of the member 5 is a thermoplastic resin. Then, when the stamper 4 is removed, as shown in FIG. 2(c), the drawing target member 5 is obtained which has a concavo-convex grid 5a transferred from the concavo-convex grid 4a of the stamper 4.

Next, the drawing target member 5 is subjected to the free-end uniaxial drawing processing with the width direction made free. In other words, the drawing target member 5 as shown in FIG. 3(a) is subjected to the free-end uniaxial drawing in the direction of the arrow (in the direction substantially parallel with the longitudinal direction of the concavo-convex grid 5a). At this point, the drawing target member 5 is heated to the appropriate temperature at which the material constituting the member 5 softens, subjected to the uniaxial drawing in the direction substantially parallel with the longitudinal direction of the microstructural concavo-convex grid 5a, and with the drawn state kept, cooled to the temperature at which the material hardens. In addition, the heating temperature and cooling temperature are suitable set corresponding to the material constituting the drawing target member 5.

By this free-end uniaxial drawing processing, the drawing target member 5 is increased in length in the arrow direction, and corresponding to the increase, decreased in width. By this means, as shown in FIG. 3(b), a drawing target member (drawn member) 5' is obtained (FIG. 4(a)) which has grid-shaped convex portions 5a' with pitches of the level of 120 nm or less. In addition, the draw ratio is set as appropriate based on a pitch of a concavo-convex grid of a prepared drawing target member and a required pitch of a microstructural concavo-convex grid of a drawn member.

Next, a metal mold 6 is obtained using the drawn member 5'. More specifically, first, a metal layer is formed on the surface having the grid-shaped convex portions 5a' of the drawn member 5' as shown in FIG. 4(a), for example, by vapor deposition method, sputtering method, electroless plating method and the like to provide conductivity. Then, a metal layer is formed on the conductivity-provided surface by electroplating and the like, and as shown in FIG. 4(b), the metal mold 6 is formed on the drawn member 5'. The thickness of the metal layer is not limited particularly, and set as appropriate corresponding to use of the metal mold 6.

Finally, by removing the drawn member 5' from the metal mold 6, as shown in FIG. 4(c), it is possible to obtain the metal mold 6 having the grid-shaped convex portions 6a with pitches of the level of 120 nm or less. As a method of removing the drawn member 5' from the metal mold 6, methods may be used of physically removing the drawn member 5' from the metal mold 6, of chemically removing using a solvent in which only the drawn member 5' dissolves, and the like.

Figure 4:
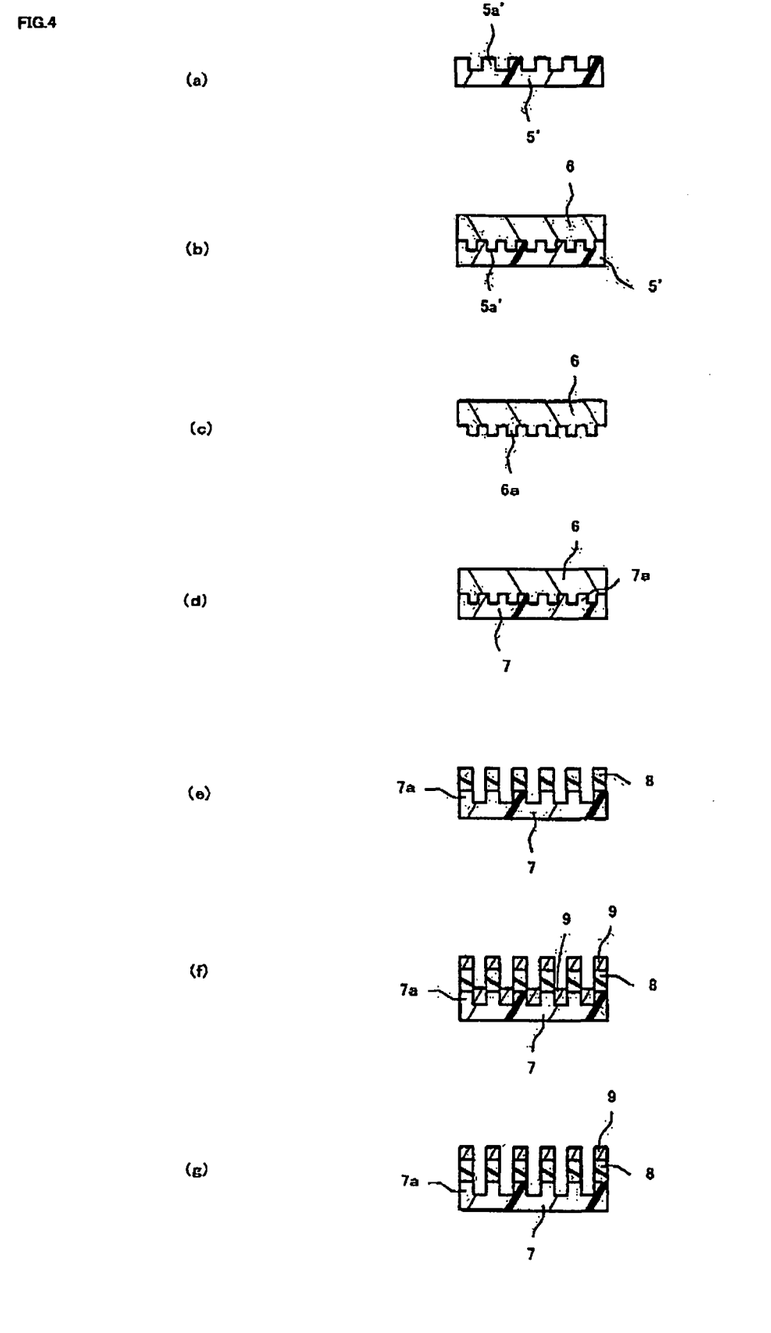
FIGS. 4(a) to 4(g) are cross-sectional views to explain the method of manufacturing the wire grid polarizer according to the embodiment of the invention.

Thus obtained metal mold 6 has grid-shaped convex portions 6a with pitches of the level of 120 nm or less. Therefore, using the metal mold 6 as a mold (master mold) in method II, as shown in FIG. 4(*d*), the metal mold (master mold) 6 is pressed against, for example, a resin substrate to transfer the grid-shaped convex portions, and it is thereby possible to obtain the resin substrate 7 having grid-shaped convex portions 7a with pitches of the level of 120 nm or less for use in the invention. With consideration given to easiness of formation of the structure having the grid-shaped convex portions on the surface of the resin substrate, it is preferable to transfer the grid-shaped convex portions by coating a UV curable resin on the master mold, and then applying UV rays to cure the resin to remove, or by coating a thermosetting resin on the master mold, and then heating to cure the resin to remove.

Process of Forming the Dielectric Layer on the Resin Substrate having the Grid-Shaped Convex Portions Next, as shown in FIG. 4(*e*), the dielectric is coated on the grid-shaped convex portions 7a of the resin substrate 7 and at least part of the side faces of the portions, and a dielectric layer 8 is formed. For example, silicon oxide is coated on the grid-shaped convex portions 7a of the resin substrate 7 and at least part of the side faces of the portions in thickness ranging from 2 nm to 200 nm by sputtering method, for example. At this point, the dielectric layer is formed thicker on the convex portions of the grid-shaped convex portions 7a than the side faces of the grid-shaped convex portions and concavo portions between the grid-shaped convex portions. In formation of the dielectric layer, the layer is preferably corrected to a shape such as an under-cut shape such that the width of the top of the grid-shaped convex portion is larger than the width of the lower portion. It is thereby possible to efficiently form the metal wires on the dielectric layer 8. An inverse-sputtering method and the like may be used as such a method of correcting the shape.

Process of Providing the Metal on the Dielectric Layer

Next, as shown in FIG. 4(*f*), the metal is deposited on the dielectric layer 8 coated on the resin substrate 7 having the grid-shaped convex portions. For example, Al 9 may be deposited in average thickness of 120 nm to 220 nm by vacuum deposition method. At this point, Al 9 is selectively deposited mainly on the convex portions than the side faces of the convex portions and concavo portions between the grid-shaped convex portions coated with the dielectric. Further, the oblique deposition method may be used so that the metal is not deposited on concave portions between the grid-shaped convex portions 1a coated with the dielectric and regions of another side faces of the convex portions. In this oblique deposition method, particularly, with consideration given to the depth of the regions between the grid-shaped convex portions 7a and to decreasing an amount of Al deposited on the regions to facilitate etching, it is preferable that the metal is deposited in the direction of a 30° or less (for example, 10° to 20°) angle formed with the normal of the plane of the substrate within the plane intersecting perpendicularly the longitudinal direction of the grid of the grid-shaped convex portions to form the metal wires.

Process of Removing Unnecessary Metal Deposited on the Microstructural Concavo-Convex Grid Then, when necessary, wet etching is performed using an acidic or alkaline etchant, for example. It is possible to remove adhered substances such as Al in the concave regions between the grid-shaped convex portions, resolve the contact of convex portions of metal wires, and modify the shape of the cross section of the metal wires to the suitable range.

According to the processes, it is possible to obtain the wire grid polarizer having the microstructural concavo-convex grid with pitches of the level of 120 nm or less that has not been supplied, as shown in FIG. 4(*g*) or FIG. 1. In the wire grid polarizer, the dielectric layer having high adhesion with the resin substrate and metal wires is provided between the resin substrate and metal wires to combine strongly, and it is thereby possible to relatively increase the height of the metal wires. As a result, by the metal wire grid with extremely fine pitches formed on the resin substrate, it is possible to exhibit the degree of polarization of 99.9% or more over almost the entire visible region that is a region of light subject to polarization.

Further, according to the method of manufacturing the wire grid polarizer of the invention, the wire grid polarizer can be manufactured in simple processes such that grid-shaped convex portions are transferred onto the resin substrate, the dielectric layer is coated on the substrate, and that the metal wires are further formed, as compared with the manufacturing method using photolithography. It is thereby possible to obtain a relatively large wire grid polarizer such that unit dimensions are 100 cm$^2$ or more. In this case, it is preferable that the metal wires each substantially have a length of about 10 cm or more, and are arranged in optically almost parallel with one another with equal pitches in $6 \times 10^4$ pieces/cm or more in the width direction of the metal wires. By obtaining the wire grid polarizer with large unit dimensions, it is possible to decrease the number of junction portions even when the grid is used in a display with a large screen. In addition, when the wire grid polarizer are connected, it is preferable that junction portions have junction lines with a line width of 100 nm to 100 μm and are configured not to transmit the light.

Described next are Examples performed to clarify the effects of the invention.

(Preparation of the Resin Substrate the Grid-Shaped Convex Portions)

Preparation of a COP plate with a concavo-convex grid shape transferred thereto.

Prepared was a nickel stamper having on the surface a concavo-convex grid with the height of the concavo-convex grid of 230 nm. The concavo-convex grid was made by patterning using the laser interference exposure method, sinusoidal shape in cross section and streak grid shape in upper face. The dimensions of the plane were 500 mm both in length and width. Using the nickel stamper, the concavo-convex grid shape was transferred to the surface of a cycloolefin resin (hereinafter, abbreviated as COP) plate with a thickness of 0.5 mm and length and width of 520 mm by hot press method, and a COP plate with the concavo-convex grid shape transferred thereto was thus prepared. The glass transition temperature (Tg) of the COP was 105° C.

More specifically, hot press was performed as described below. First, a pressing machine was evacuated, and the nickel stamper and COP plate were heated to 190° C. After the nickel stamper and COP plate reached 190° C., the microstructural concavo-convex grid of the nickel stamper was transferred to the COP plate at a pressing pressure of 2 MPa for four minutes of pressing time. Further, with the pressing pressure kept at 2 MPa, the nickel stamper and COP plate were cooled to 40° C., the vacuum was released, and then, the pressing pressure was released. When the pressing pressure was released, the nickel stamper and COP plate were easily removed. The surface shape of the COP plate was observed using a field-emission scanning electron microscope (hereinafter, abbreviated as FE-SEM), and it was confirmed that the concavo-convex grid shape of the nickel stamper was transferred faithfully.

Reduction in pitch by drawing Next, the COP plate with the concavo-convex grid shape transferred thereto was cut into 520 mm×460 mm rectangles to be COP plates for drawing as drawing target members. At this point, the plates were cut so that the longitudinal direction (520 nm) of the 520 mm×460 mm rectangle was substantially parallel with the longitudinal direction of the concavo-convex grid.

Silicon oil was coated on surfaces of the COP plates for drawing by spray, and placed in a circular air oven at about 80° C. for 30 minutes. Next, the COP plate for drawing was fixed by chucks of a drawing machine at its opposite ends of 10 mm in the longitudinal direction, and placed in this state in a circular air oven with the temperature adjusted to 113±1° C. for 10 minutes. Then, drawing was performed at speed of 250 mm/min, and finished when the distance between the chucks was drawn by five times, and twenty seconds later, the drawn COP plate was placed in an atmosphere of room temperature, and cooled with the distance between the chucks kept. The drawn COP plate was almost uniformly constricted at about 40% of the center portion, and the width of the most shrank portion was 200 mm. Similarly, the COP plates were drawn while changing only the distance between the chucks to 3.5 times and 2.5 times, and the minimum widths of the center portions of the drawn COP plates were 240 mm and 280 mm, respectively.

The surface and cross section of each of these three types of drawn COP plates were observed by FE-SEM, and it was understood that the pitch and height of the microstructural concavo-convex grid of each of the plates were 100 nm/95 nm (pitch/height), 120 nm/113 nm, or 140 nm/133 nm, the cross section was in the sinusoidal shape, the shape from the upper face was a streak-shaped grid shape, and that the plates were shrank substantially in similar figures to the concavo-convex grid shape prior to the drawing.

Preparation of Nickel Stampers

Surfaces of obtained drawn COP plates with respective pitches of 100 nm, 120 nm and 140 nm were coated with gold in 30 nm by sputtering as processing of providing conductivity, and given electro-nickel-plating, and nickel stampers were prepared each having on its surface a microstructural concavo-convex grid with a thickness of 0.3 mm, length of 300 mm, and width of 180 mm.

Figure 5:
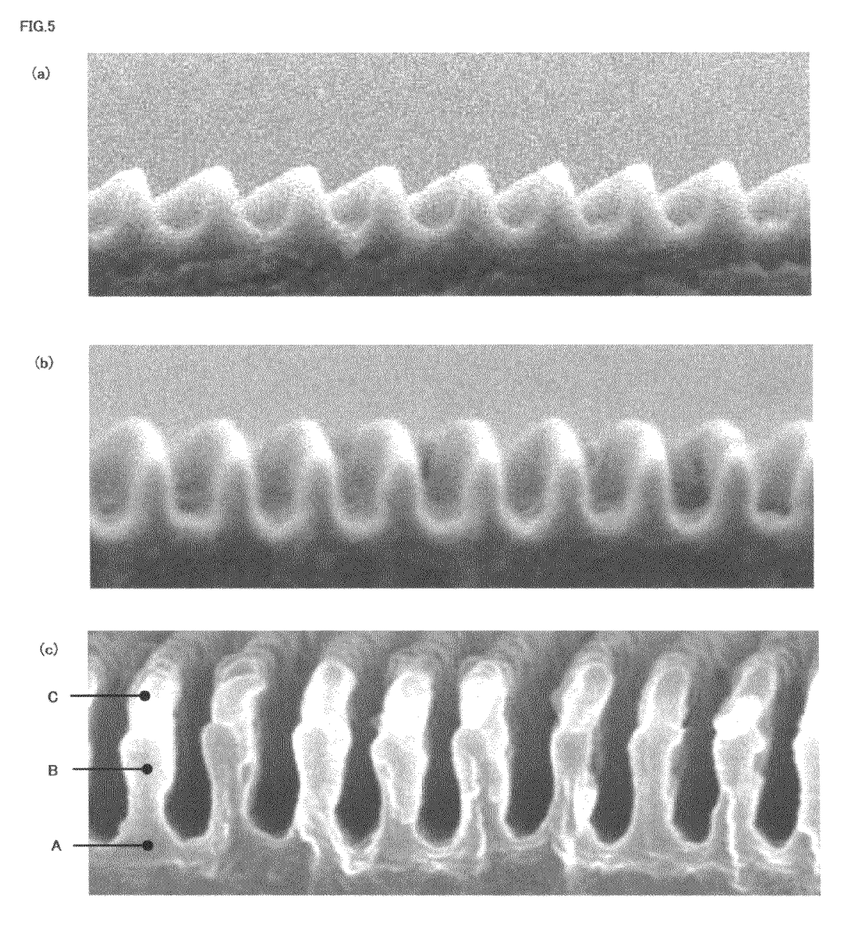
FIG. 5(a) is a typical SEM image of a cross section of a grid-shaped convex-portion transferred film according to the embodiment of the invention.
FIG. 5(b) is a typical SEM image of a cross section of a dielectric coated on grid-shaped convex-portion transferred film according to the embodiment of the invention.
FIG. 5(c) is a typical SEM image of a cross section of the wire grid polarizer according to the embodiment of the invention.

Preparation of grid-shaped convex-portion transferred films using UV curable resin A UV curable resin (TB3078D, Three Bond Co., Ltd. Refractive index: 1.41) with a thickness of about 0.03 mm was coated on a polyethylene terephthalate resin film (hereinafter referred to as a PET film) with a thickness of 0.1 mm. With the coated surface downward, the PET film was mounted on each of the above-mentioned nickel stampers respectively having microstructural concavo-convex grids with pitches of 100 nm, 120 nm and 140 nm starting with the end portions for the air not to enter between the nickel stamper and film, and radiated with UV rays of 1000 mJ/cm$^2$ from the PET film side using a UV lamp with the center wavelength of 365 nm to transfer the microstructural concavo-convex grid of the nickel stamper. Then, the PET film was removed from the nickel stamper, and further radiated with UV rays of 500 mJ/cm$^2$ under an atmosphere of nitrogen to cure an uncured component of the UV curable resin, and prepared was a grid-shaped convex-portion transferred film with a length of 300 mm and width of 180 mm. The obtained grid-shaped convex-portion transferred film was observed using FE-SEM, it was confirmed that the cross section was in the sinusoidal shape and that the shape from the upper face was a streak-shaped grid shape, and the height $H_1$ of the convex portion of the resin substrate was obtained in the grid-shaped convex-portion transferred film. The results are shown in Table 1. FIG. 5($a$) is a typical SEM image of the film.

(Preparation of a Wire Grid Polarizer:)

EXAMPLES 1 TO 6

Formation of a dielectric layer using a sputtering method

A dielectric was coated on each of the grid-shaped convex-portion transferred films respectively having three kinds of pitches prepared by using the UV curable resin as described above, using the sputtering method. This embodiment describes the case of using silicon oxide or silicon nitride as the dielectric. The dielectric was coated at an Ar gas pressure of 0.67 Pa, sputtering power of 4 w/cm$^2$ and coating rate of 0.22 nm/sec. A glass substrate with a smooth substrate was set in a sputtering machine as a thickness comparative sample concurrently with the grid-shaped convex-portion transferred film, and film formation was performed so that a deposition thickness of the dielectric on the smooth glass substrate was 20 nm. The cross section of the grid-shaped convex-portion transferred film coated with the dielectric (hereinafter, referred to as a dielectric coated grid-shaped convex-portion transferred film) was observed using FE-SEM to obtain the height $H_2$ of the grid-shaped convex portion. The results are shown in Table 1. FIG. 5($b$) is a typical SEM image of the film.

Deposition of Metal using a Vacuum Deposition Method

After the dielectric was deposited on each of the grid-shaped convex-portion transferred films respectively having three types of pitches, metal was deposited using an electron beam vacuum deposition method (EB deposition method). This embodiment describes the case of using aluminium (Al) as the metal. Deposition of aluminium was performed at room temperature, a degree of vacuum of 2.5×10$^{-3}$ Pa and deposition rate of 4 nm/sec. A glass substrate with a smooth surface was set in an EB deposition machine as a thickness comparative sample concurrently with the dielectric coated grid-shaped convex-portion transferred film, and vapor deposition was performed so that a thickness of deposition of aluminium on the smooth substrate was 200 nm. Deposition of aluminium was performed using the oblique deposition method, and an incident angle θ formed between the normal of the substrate plane and the deposition source was 10° within the plane perpendicularly intersecting the grid longitudinal direction of the microstructural concavo-convex grid in Examples 1 to 5, while being 20° only in Example 6.

Removal of Unnecessary Metal by Etching

After the dielectric layers and Al was deposited on the grid-shaped convex-portion transferred films respectively having three types of pitches, the films were cleaned (etching) in an aqueous 0.1 wt % sodium hydroxide solution at room temperature for 30 to 90 seconds of the processing time while being changed at ten-second intervals, and rinsed immediately to halt etching. The films were dried, and the wire grid polarizers of the invention were obtained. The wire grid polarizer was 300 mm long and 180 mm wide. The cross section of each of three types of wire grid polarizer was observed using FE-SEM to measure the pitch of the grid-shaped convex portions, and height $H_3$ and width $w_3$ of deposited aluminium. The results are also shown in Table 1. FIG. 5($c$) is a typically SEM image of the cross section of the obtained wire grid polarizer. As can be seen from FIG. 5($c$), the dielectric layer B is formed on the resin substrate (UV curable resin) A, and the metal wires (Al layer) C are formed on the dielectric layer B. Optical characteristics were evaluated on the prepared wire grid polarizer of Examples 1 to 6. The results are shown in Table 1, and FIGS. 7 and 8.

As Comparative Example 1, aluminium was deposited on the UV curable resin of the grid-shaped convex-portion transferred film in the same way as in the above-mentioned Examples except the dielectric not coated, and cleaned in the aqueous 0.1 wt % sodium hydroxide solution for 60 seconds. In this case, wires of Al required to exhibit the polarization performance were removed partially from the grid-shaped convex portions, and it was not possible to prepare any wire grid polarizer to be evaluated.

Figure 7:
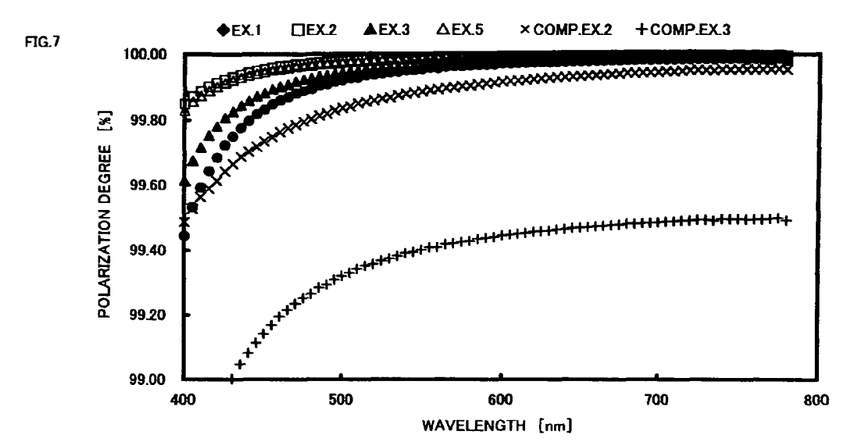
FIG. 7 is a graphical plot showing polarization characteristics of wire grid polarizer according to the embodiment of the invention and of wire grid polarizer of Comparative Examples.
Figure 8:
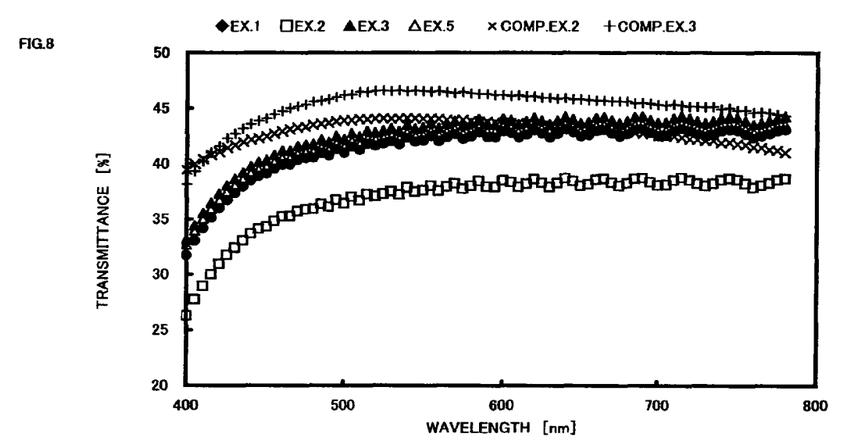
FIG. 8 is a graphical plot showing light transmittance characteristics of the wire grid polarizer according to the embodiment of the invention and of the wire grid polarizer of Comparative Examples.

800 nm as the visible light. FIG. 7 shows changes in degree of polarization in the range of 400 nm to 800 nm, and FIG. 8 shows changes in light transmittance in the range of 400 nm to 800 nm.

Degree of polarization=$[(I\text{max}-I\text{min})/(I\text{max}+I\text{min})] \times 100\%$ Light transmittance=$[(I\text{max}+I\text{min})/2] \times 100\%$ Herein, Imax represents the intensity of transmitted light in parallel Nicol state, while Imin represents the intensity of transmitted light in orthogonal Nicol state.

TABLE 1

| | MATERIAL OF DIELECTRIC *1 | p [nm] | H1 [nm] | H2 [nm] | H3 [nm] | w3 [nm] | POLARIZATION DEGREE [%] *2 | TRANSMITTANCE [%] *2 |
|---|---|---|---|---|---|---|---|---|
| EX. 1 | SILICON NITRIDE | 140 | 128 | 165 | 153 | 67 | 99.96 | 42 |
| EX. 2 | SILICON NITRIDE | 140 | 128 | 165 | 180 | 69 | 99.99 | 38 |
| EX. 3 | SILICON NITRIDE | 120 | 110 | 141 | 151 | 54 | 99.97 | 43 |
| EX. 4 | SILICON OXIDE | 120 | 110 | 155 | 153 | 54 | 99.97 | 41 |
| EX. 5 | SILICON NITRIDE | 100 | 92 | 128 | 145 | 45 | 99.99 | 43 |
| EX. 6 | SILICON NITRIDE | 120 | 110 | 144 | 152 | 54 | 99.97 | 41 |
| COMP. EX. 1 | NON | 120 | 110 | — | NOT FORMED | NOT FORMED | — | — |
| COMP. EX. 2 | — | 144 | — | — | 180 | 70 | 99.89 | 44 |
| COMP. EX. 3 | | 144 | — | — | 150 | 68 | 99.40 | 47 |

*1 REFRACTIVE INDEX OF SILICON OXIDE: 1.49
REFRACTIVE INDEX OF SILICON NITRIDE: 2.05
*2 VALUES OF THE DEGREE OF POLARIZATION AND LIGHT TRANSMITTANCE FOR LIGHT WITH A WAVELENGTH OF 550 NM

As Comparative example 2, a commercially available wire grid polarizer (ProFlux Polarizer PPL03C (General Purpose), MOXTEK Inc.) with a glass substrate as a base was used.

As Comparative Example 3, the same commercially available wire grid polarizer with a glass substrate as a base as in Comparative Example 2 was etched in the aqueous 0.1 wt % sodium hydroxide solution for 20 seconds, rinsed immediately to halt etching, and dried.

Figure 6:
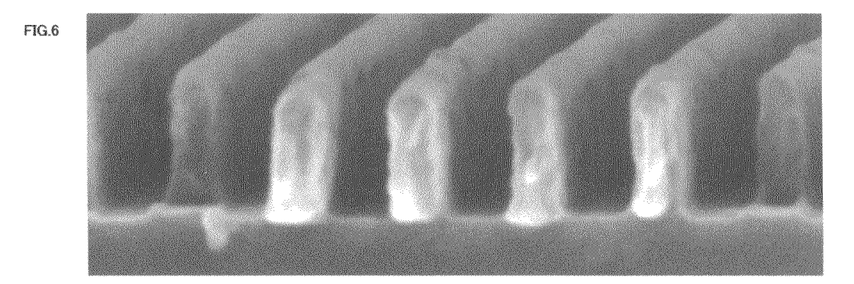
FIG. 6 is a typical SEM image of a cross section of a wire grid polarizer of Comparative Example 2.

The cross section of each of the wire grid polarizer was observed using FE-SEM to measure the pitch of the grid-shaped convex portions and the height and width of deposited aluminum. The results are also shown in Table 1. Further, FIG. 6 shows a SEM image of the cross section of the wire grid polarizer of Comparative Example 2. As can be seen from FIG. 6, the metal wires (Al) are formed on the glass substrate. These wire grid polarizer were evaluated on optical characteristics as in the Examples. The results are also shown in Table 1, and FIGS. 7 and 8.

(Evaluation of Optical Characteristic using a Spectrophotometer)

The degree of polarization and light transmittance were measured on each of obtained wire grid polarizer of Examples and Comparative Examples using a spectrophotometer. Herein, the intensity of transmitted light was measured in parallel Nicol state and orthogonal Nicol state for linearly polarized light, and the degree of polarization and light transmittance were calculated from following equations. A range of measured wavelengths was from 400 nm to As can be seen from FIG. 7, wire grid polarizer (Examples 1, 2, 3 and 5) according to the present invention exhibited excellent degrees of polarization over almost the entire visible region. Further, as can be seen from FIG. 8, the wire grid polarizer according to the invention exhibited excellent light transmittances over almost the entire visible region. Meanwhile, as shown in FIG. 7, wire grid polarizers of the Comparative Examples were low in the degree of polarization at short wavelengths in the visible region. Thus, it was found that the wire grid polarizer according to the invention has the microstructural concavo-convex grid with pitches of the level of 120 nm or less, and exhibits the excellent degree of polarization over a wide range in the visible region.

According to the invention, since the method has the steps of forming a dielectric layer on a region including grid-shaped convex portions of a resin substrate having the grid-shaped convex portions on its surface, and forming metal wires on the dielectric layer, and it is possible to obtain a wire grid polarizer having a microstructural concavo-convex grid with pitches of the level of 120 nm or less that has not been implemented.

The present invention is not limited to the above-mentioned embodiment and examples, and is capable of being carried into practice with various modifications thereof. For example, the dimensions and materials in the above-mentioned embodiment and examples are illustrative, and are capable of being modified as appropriate. Further, the polarizer in the above-mentioned embodiment is not necessarily a plate-shaped member, and may be in the shape of a sheet or in the shape of a film when necessary. The above-mentioned embodiment describes the case of applying the wire grid polarizer to a liquid crystal display device, but the invention is applicable similarly to devices requiring polarization other than the liquid crystal display device. Further, the invention is capable of being carried into practice in various modifications as appropriate without departing from the scope of the invention.

This application is based on the Japanese Patent Applications No. 2005-301884 filed on Oct. 17, 2005 and No. 2006-232968 filed on Aug. 30, 2006, the entire contents of which are expressly incorporated by reference herein.

What is claimed is:

1. A method of manufacturing a wire grid polarizer, comprising the steps of:
forming a dielectric layer on a region including grid-shaped convex portions of a resin substrate having grid-shaped convex portions and concave portions on a surface thereof; and
forming metal wires on one side faces of the convex portions of the dielectric layer by using oblique vapor deposition from one side face of the convex portions in which the metal wires are formed by depositing metal in the direction of an about 30° or less angle formed between the normal of the plane of the substrate and a source of vapor deposition within a plane perpendicularly intersecting a longitudinal direction of a grid of the grid-shaped convex portions, wherein the grid-shaped convex portions of the resin substrate have pitches 150 nm or less and a height 0.5 time to 2.0 times the pitches of the grid-shaped convex portions and the aspect ratio (a ratio being the ratio of the height ($H_3$) to the width ($w_3$), of the metal wires ranges from 2 to 5.

2. The method of manufacturing a wire grid polarizer according to claim 1, wherein the step of forming the dielectric layer, the dielectric layer is formed to cover the grid-shaped convex portions of the resin substrate and at least part of side faces of the portions.

3. The method of manufacturing a wire grid polarizer according to claim 1, wherein pitches of the grid-shaped convex portions on the surface of the resin substrate are less than or equal to 120 nm.

4. The method of manufacturing a wire grid polarizer according to claim 1, wherein the resin substrate is prepared by performing uniaxial drawing on a drawing target member with a concavo-convex grid with pitches of 100 nm to 100 μm on its surface, in the direction substantially parallel to a longitudinal direction of the concavo-convex grid, with a width of the drawing target member made free in the direction substantially perpendicular to the longitudinal direction.

5. The method of manufacturing a wire grid polarizer according to claim 1, wherein a grid shaped convex portion is applied to a resin substrate by transferring a microstructual concavo-convex grid to the resin substrate, using a mold that is made by performing uniaxial drawing on a drawing target member with a concavo-convex grid with pitches of 100 nm to 100 μm on its surface, in the direction substantially parallel to a longitudinal direction of the concavo-convex grid, with a width of the drawing target member made free in the direction substantially perpendicular to the longitudinal direction.

6. The method of manufacturing a wire grid polarizer according to claim 1, wherein the resin substrate is shaped using a mold having grid-shaped convex portions.

7. The method of manufacturing a wire grid polarizer according to claim 1, wherein the grid-shaped convex portions have a height 1.0 time to 2.0 times the pitches of the grid-shaped convex portions.

8. The method of manufacturing a wire grid polarizer according to claim 1, wherein the dielectric layer has a thickness ranging from 2 nm to 200 nm.

9. The method of manufacturing a wire grid polarizer according to claim 1, wherein the metal wires have a height ranging from 120 nm to 200 nm.

10. The method of manufacturing a wire grid polarizer according to claim 1, wherein a height difference between a convex portion peak and a concave portion valley ranges from 100 nm to 300 nm.

11. The method of manufacturing a wire grid polarizer according to claim 1, wherein the grid-shaped convex portions of the resin substrate have pitches of 80 nm or more.

* * * * *